United States Patent [19]

Hwang

[11] Patent Number: 5,298,879
[45] Date of Patent: Mar. 29, 1994

[54] VEHICLE ALARM SYSTEM HAVING A CODED VISUAL RESPONSE

[76] Inventor: Shih-Ming Hwang, No. 11, Alley 12, Lane 7, Ching-Tyan St., Taipei, Taiwan

[21] Appl. No.: 983,742

[22] Filed: Dec. 1, 1992

[51] Int. Cl.$^5$ ............................................. B60Q 3/00
[52] U.S. Cl. .................................. 340/438; 340/426; 340/534
[58] Field of Search ...................... 340/425.5, 426, 428, 340/429, 430, 641, 534, 438

[56] References Cited

U.S. PATENT DOCUMENTS

| | | | |
|---|---|---|---|
| 3,810,150 | 5/1974 | Jacobs | 340/641 X |
| 4,109,246 | 8/1978 | Budrys | 340/534 X |
| 4,833,449 | 5/1989 | Gaffigan | 340/522 X |
| 4,975,678 | 12/1990 | Hwang | 340/426 |

Primary Examiner—Hezron E. Williams
Assistant Examiner—Christine K. Oda
Attorney, Agent, or Firm—Morton J. Rosenberg; David I. Klein

[57] ABSTRACT

An alarm system having latching circuits for locking a signal detected by a respective sensor is provided. The alarm system includes counting control circuits for controlling a visual alarm, the visual alarm flashing a different number of times depending on which of a plurality of sensors is triggered. A counter for controlling the length of time that the visual alarm flashes is also provided.

1 Claim, 2 Drawing Sheets

VEHICLE ALARM SYSTEM HAVING A CODED VISUAL RESPONSE

BACKGROUND OF THE INVENTION

The present invention relates to an alarm system. More particularly, this invention is directed to a motor vehicle alarm system which indicates the location of the triggered sensor. The indication being provided by means of a visual alarm which flashes at a predetermined frequency during a specific length of time.

Various alarm devices and systems are known and widely used in motor vehicles to provide a warning of danger. A motor vehicle alarm system may comprise several sensors installed at different locations for detecting different changes of condition. For example, multiple sensors may be simultaneously used in a motor vehicle alarm system, installed in a motor vehicle at different locations, for detecting the locked condition of the engine hood, the trunk, the car doors or the ignition switch. Sensors can also provide for monitoring the integrity of the electric circuit, vibration, or collision of the motor vehicle. These detectors are commonly connected to a common visual alarm, which is activated to give a warning once any detector is triggered. The disadvantage of such prior art vehicle alarm systems is that the user cannot immediately identify the location of the sensor being triggered. Without knowing the nature of a warning, the user cannot immediately take the necessary actions required.

SUMMARY OF THE INVENTION

The present invention is directed to a vehicle alarm system which obviates the disadvantages of prior art systems. It is therefore an object of the present invention to provide an alarm system which uses different sensors installed at different locations and which indicates the location of the detector which has been triggered by means of flashing a visual alarm at a predetermined frequency, for a specific length of time, the length of time being a function of which sensor was triggered. It is another object of the present invention to provide an alarm system which can be conveniently inspected if any sensor is damaged. It is still another object of the present invention to provide an alarm system which is easy to inspect and maintain.

DETAILED DESCRIPTION OF THE PREFERRED EMBODIMENT

Figure 1:
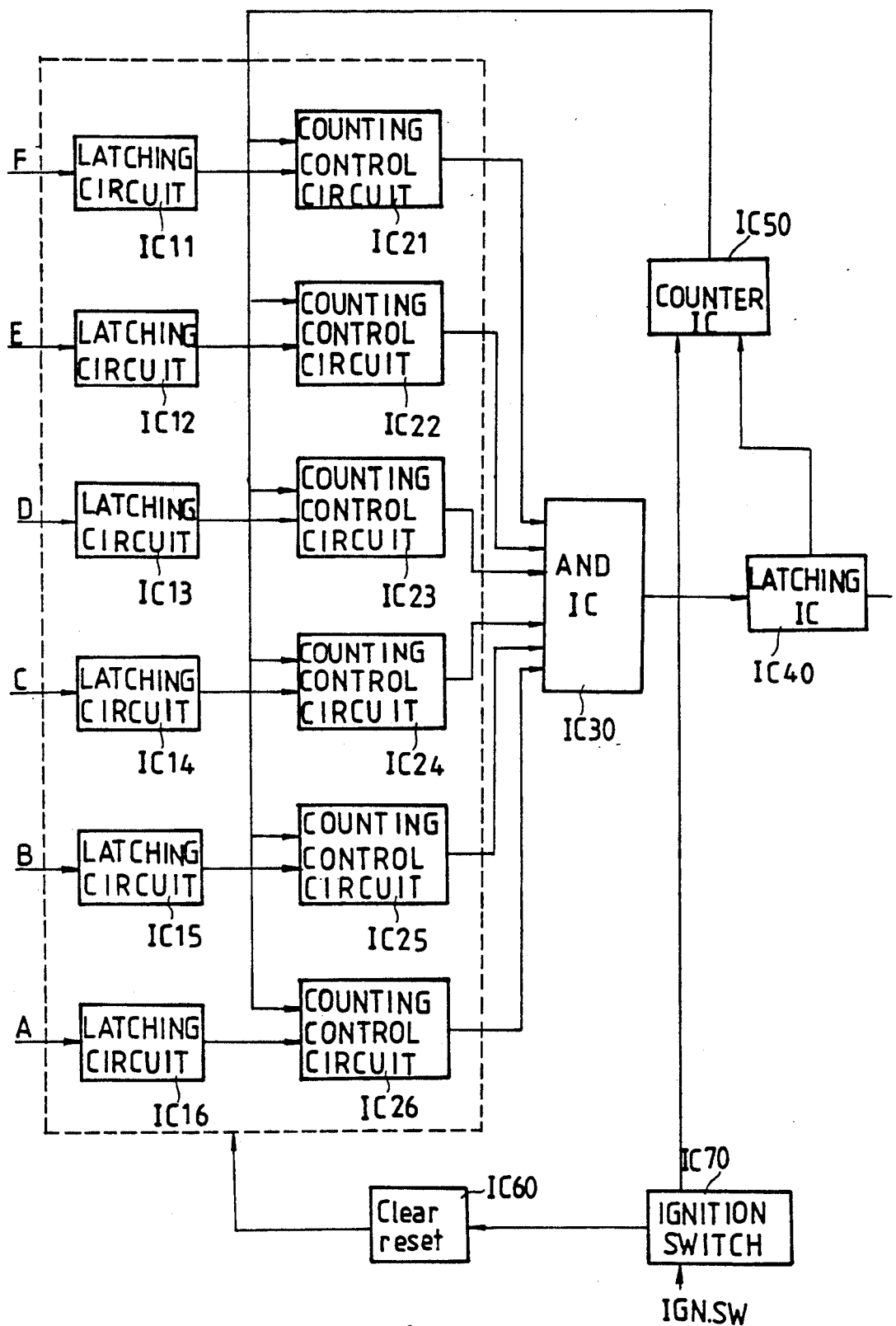
FIG. 1 is a block diagram according to the present invention.

Referring to FIG. 1, the memory alarm system of the present invention includes signal input terminals A, B, C, D, E and F. The first signal input terminal A is connected to the trunk lock and the engine hood lock. If the trunk lock or the engine hood lock is opened or not properly closed, the first signal input terminal A receives a signal causing a visual alarm to be activated to continuously flash five times during multiple cycles where a cycle is 4 seconds in length. The second signal input terminal B is connected to the electric circuit of the motor vehicle through an electric current sensor. If the electric circuit is cut off or damaged, the second signal input terminal B receives a signal causing the visual alarm to be activated to continuously flash six times during each 4 second cycle. The third signal input terminal C is connected to the front and rear door locks. If either a front door or a rear door is opened by an intruder, or not closed properly, the third signal input terminal C receives a signal causing a respective visual alarm to be actuated to continuously flash four times during each 4 second cycle. The fourth signal input terminal D is connected to a vibration detector. If the motor vehicle is caused to vibrate because of an intrusion or a collision, the fourth signal input terminal D receives a signal causing the visual alarm to continuously flash three times during each 4 second cycle. The fifth signal input terminal E is connected to an emergency alarm control switch. If the emergency alarm control switch is switched on, the fifth signal input terminal E provides a signal to the visual alarm causing it to flash twice during each 4 second cycle. The sixth signal input terminal F is connected to the ignition switch. If the ignition switch is started when the alarm system is on, the sixth signal input terminal F receives a signal causing the visual alarm to flash once during each 4 second cycle. The aforesaid arrangement is an example of an alarm system installation according to the present invention. Alterations may be made as required to accommodate different requirements.

Referring to FIG. 1 again, each signal input terminal A-F is connected to a respective counting control circuit IC21-IC26 through a respective latching circuit IC11-IC16. Each counting control circuit IC21-IC26 is respectively connected to an AND circuit IC30 and a counter IC50 for control of the flashing. Due to the arrangement of the AND circuit IC30, the alarm system receives only the first entry of any signals from the signal input terminals A-F. Therefore, a clear/reset key IC60 is provided for clearing the latching circuits IC1-1-IC12, thereby resetting the alarm system. There is also provided a setting circuit IC40 for setting the counter IC50. Furthermore, a power connection for clearing the counter of the alarm system is provided from the ignition switch 70 of the motor vehicle.

Figure 2:
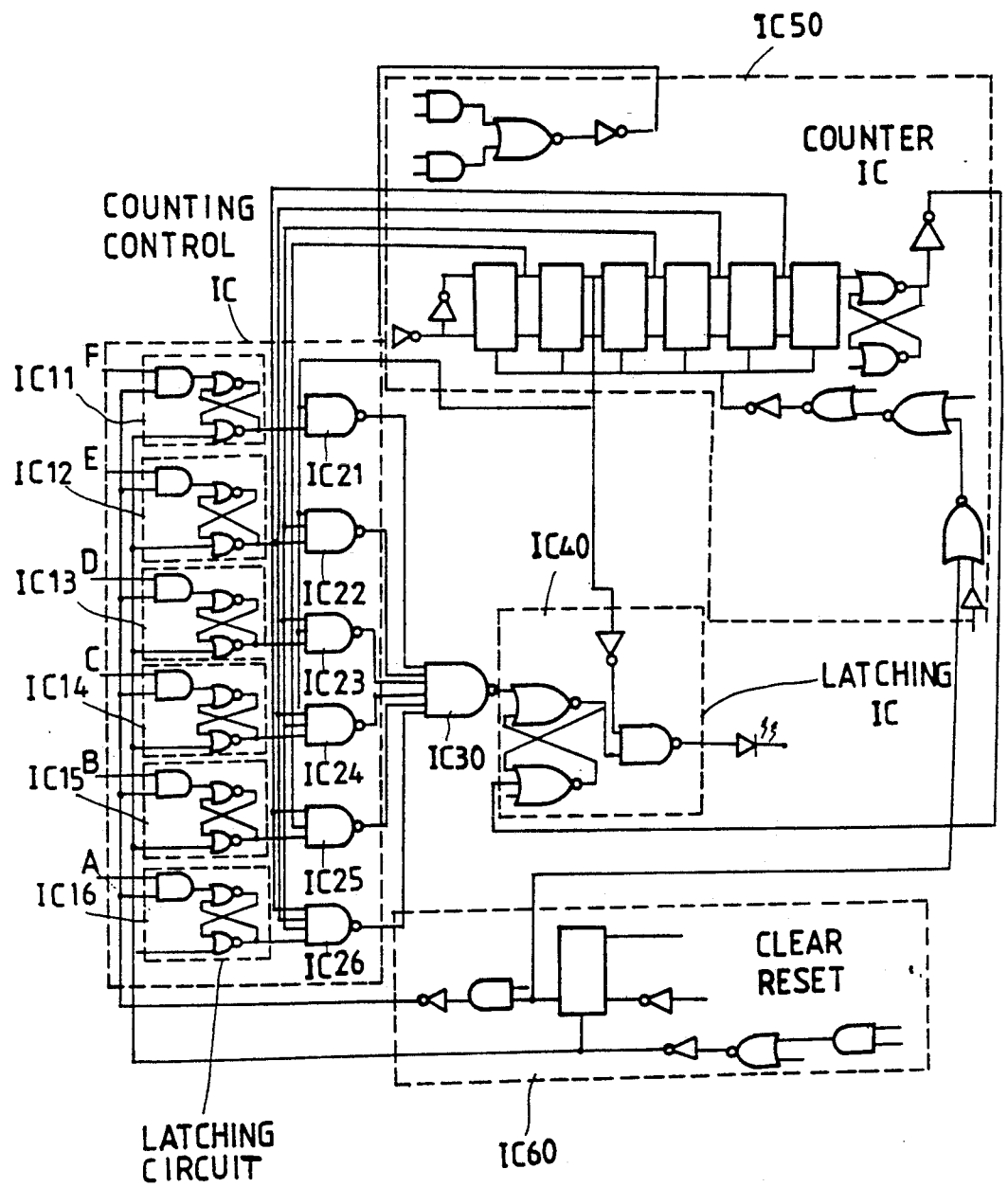
FIG. 2 is a circuit diagram according to the present invention.

Referring to FIG. 2, the terminals A, B, C, D, E and F are the aforesaid six signal input terminals. Any detected signal from any one of the signal input terminals is locked by the respective latching circuit IC11-IC16 and controlled by the first counting control circuit IC21, the second counting control circuit IC22, the third counting control circuit IC23, the fourth counting control circuit IC24, the fifth counting control circuit IC25 or the sixth counting control circuit IC26 to flash the visual alarm five times, six times, four times, three times, twice, or once, respectively. In the drawing of FIG. 2, IC30 is an AND IC, and IC40 is a latch IC. According to the present preferred embodiment, a respective latching circuit IC11-IC16 is triggered when a sensor connected to any signal input terminal A, B, C, D, E or F detects a signal. The detected signal is sent to the AND circuit IC30 through the respective counting control circuit IC21-IC26. Therefore, the signal which was first sent to the AND circuit IC30 is latched, any subsequent signal is unable to affect IC40, so as to eliminate interference. The IC40 locks the signal from the AND IC, and the IC50 starts to count according to the predetermined setting once the signal from the AND circuit IC30 is latched. In the present preferred embodiment, the visual alarm is a light emitting diode. According to the flashing sequence of the light emitting diode, it can be determined which sensor (detecting point) was triggered.

I claim:

1. A alarm system for coupling to a vehicle, comprising:
- a counter circuit for providing (1) a predetermined sequence of output signals on each of a plurality of outputs, and (2) a timing cycle;
- a plurality of input latch circuits, each of said plurality of input latch circuits coupled to a respective one of a plurality of sensors disposed in disparate locations on said vehicle, each one of said plurality of input latch circuits providing an output responsive to being triggered by said respective one of said plurality of sensors detecting a predetermined change in a condition being monitored thereby;
- a plurality of counting control circuits, each of said counting control circuits having (1) a first input coupled to a respective one of said plurality of input latch circuits, and (2) at least one second input coupled to a particular one of said plurality of outputs of said counter circuit for selecting a particular count sequence to encode the triggered output from said plurality of input latch circuits;
- an AND circuit having a respective input coupled to an output of each of said plurality of counting control circuits;
- an output latch circuit having a first input coupled to an output of said AND circuit for receiving said particular count sequence from said triggered one of said plurality of said input latch circuits, said output latch circuit having a second input coupled to a particular one of said plurality of outputs of said counter circuit for providing a timing pulse thereto, said output latch circuit having an output coupled to a visual indicator for repeatedly flashing said indicator a predetermined number of times responsive to said triggered one of said plurality of input latch circuits; and,
- means for resetting both said counter circuit and said input latch circuits coupled to an ignition switch of said vehicle.

* * * * *